Sept. 28, 1937.   A. A. FORSBERG   2,094,147
COUPLING FOR VACUUM CLEANERS
Filed April 18, 1935
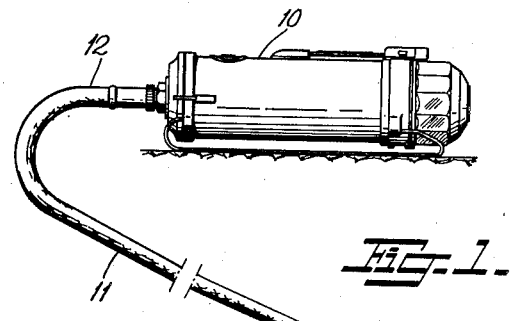
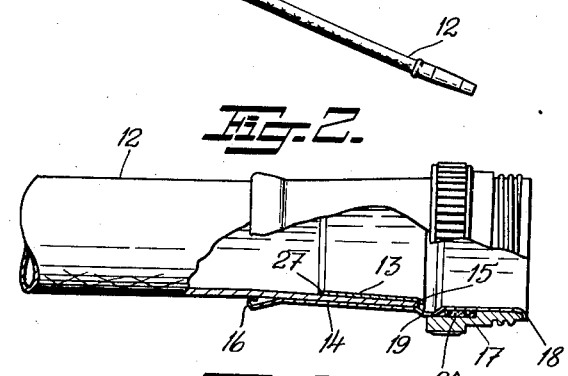
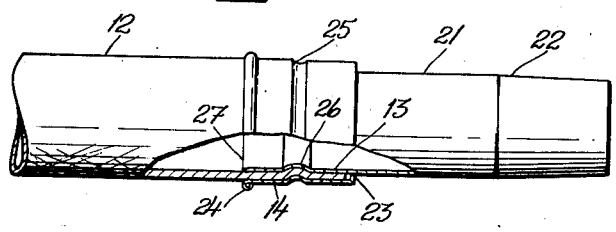
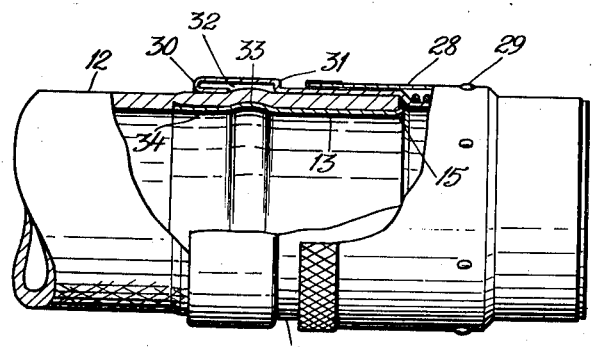
INVENTOR,
Axel Albert Forsberg
BY
his ATTORNEY Patented Sept. 28, 1937

2,094,147

UNITED STATES PATENT OFFICE 2,094,147

COUPLING FOR VACUUM CLEANERS

Axel Albert Forsberg, Stockholm, Sweden, assignor to Electrolux Corporation, Dover, Del., a corporation of Delaware Application April 18, 1935, Serial No. 17,029
In Germany April 18, 1934

3 Claims. (Cl. 285—84)

My invention relates to means for securing a rigid hollow end member to a hose, such as a vacuum cleaner hose.

One of the objects of my invention is to provide a secure connection between the hose and the end member without requiring the use of glue or other adhesive, although an adhesive may be employed if desired. A further object is to provide a smooth, stream-lined interior which will not interfere with the passage of air or dirt through the hose.

My invention will be understood by consideration of the following description taken in conjunction with the accompanying drawing forming part of this specification, and of which:

Fig. 1 illustrates a vacuum cleaner, the hose of which is provided with devices according to the present invention;

Fig. 2 is a view, partially in cross-section showing an embodiment of the invention in which the protecting sleeves are conically shaped;

Fig. 3 shows another embodiment of the invention; and

Fig. 4 a further embodiment of the invention.

In Fig. 1 reference character 10 designates a vacuum cleaner to the suction opening of which is connected a hose 11 which however may, if desired, be connected to the blowing opening of the apparatus. In Fig. 2 one end 12 of the hose 11 is shown partly in section. The inner wall of the end 12 of the hose is lined with a sleeve 13, while its outer surface is surrounded by another sleeve 14. As appears clearly from the figure, both sleeve 13 and sleeve 14 are conical so that, when the two sleeves are in position, the end 12 of the hose also assumes a conical shape. The mounting of the protecting sleeves is preferably carried out in such a way that the sleeve 13, which is flared at 15, its outer end, is first inserted in the hose so far that the flare 15 abuts against the end of the wall of the hose. The sleeve 14 which has previously been pushed relatively far on to the hose is now pulled towards that end of the hose which is provided with sleeve 13. The dimensions of the cones 13 and 14 are such that, when the sleeve 14 is pulled forcibly to the right (Fig. 2), the hose is pressed firmly between the sleeves. In certain circumstances the hose 11 may first be pulled entirely through sleeve 14, until the parts assume the position shown in Fig. 2. The reciprocal axial movement of the sleeves 13 and 14, for clamping the end 12 of the hose therebetween, may preferably be effected by machinery of special construction. The hose 11 itself is in this case made of a resilient material such as rubber. To protect the operator from injury the inner end of the sleeve 14 is provided with an inward-directed and preferably elastic flanging 16. The opposite end of sleeve 14 is formed as a connecting member so as to permit the hose being connected to a vacuum cleaner, a nozzle or the like. The connecting member shown by way of example includes a hollow member 17 provided with outer threads and rotatably journalled on the outwardly extended end of the sleeve 14. Axial movement of the member 17 is prevented partly by a front flange 18 on part 14 and partly by an outwardly extending annular bead 19. Between parts 14 and 17 is an annular packing 20 of felt or the like. The inner end of the sleeve 13 is provided with a bevel 21 to prevent objects passing through the hose, such as matches or the like, from being caught on the edge, as this would easily cause choking. It is evident that in an embodiment such as that shown in Fig. 2 the connection and tightness between parts 12, 13 and 14 will be the better and firmer, the heavier the tensile stress on the hose 11. Instead of having both members 13 and 14 conically shaped, it might under certain circumstances be preferable to have one of the sleeves, for instance, the sleeve 13, cylindrical and to make that part of sleeve 14 which surrounds the hose end slightly conical in such manner that the wall of the hose end 12 will be subjected to a wedging action when sleeve 14 is pulled or pressed towards the right end of the hose (Fig. 2).

In Fig. 3 the inner sleeve 13 extends beyond the end of the hose and forms the connecting member 21 for connecting the hose, the connecting member being in this case formed with a conical part 22. This connection is not rotatable as in the case described above. The outer protecting sleeve 14 is, at its front end, bent inwards more or less at a right angle, as shown at 23, while the opposite rear end is equipped with an outwardly extending flange 24. The two sleeves 13 and 14 are in this case not conical but cylindrical. They are kept fixed to the hose owing to the fact that, after they have been inserted in the end of the hose and pushed on over it, respectively, an annular bead 25 is pressed in from without. This deformation of the outer sleeve 14 will press the material of the hose against the wall of the inner sleeve 13, or the latter may be provided with a corresponding annular groove 26 into which extends that part of the hose wall which is pressed inwards by the bead 25. In this way an extremely simple and absolutely reliable connection is ensured between the connecting part of the hose and the hose itself, at the same time resulting in an efficient and reliable protecting device for the end of the hose. Besides, the fastening device described is extremely simple and cheap in manufacture. The inner closing edge of the sleeve 13 may, in accordance with the corresponding sleeve of Fig. 2, be provided with a bevel 27.

In the embodiment according to Fig. 4 the inner sleeve 13 serves, contrary to the embodiment according to Fig. 3, for a connection with the connecting part of the hose and acts at the same time as a protecting device for the end of the hose. The outer sleeve 14 has a resiliently mounted connecting member 28 provided with a number of elastic balls 29 which may penetrate into a corresponding annular groove in the vacuum cleaner or the like. The inner end of the sleeve 14 is provided with a preferably elastic flange 30 as well as a stop 31, these parts forming an annular recess 32. When the sleeves 13 and 14 are fixed to the end of the hose, a bead 33 in alignment with recess 32 is pressed outwards in sleeve 13 by means of rolling or the like, with the result that the material of the hose wall is pressed into the recess 32. The mode of fixing is thus similar to that described in connection with Fig. 3. The inner sleeve 13 is not only flared at 15 at its front end, in accordance with the embodiment of Fig. 2, but also the inner end may be flared outwardly, as shown at 34. This flaring of the end of the sleeve is preferably carried out after the sleeve has been inserted in the end of the hose with the help of a punch or the like, in which case the inner edge of the sleeve preferably penetrates somewhat into the wall of the hose so as to ensure a smooth transition between the hose and the sleeve 13. This is of great importance, as it will particularly prevent objects from sticking at this place. If the flaring of the end of the sleeve should not suffice for this purpose, for example if the hose is made of relatively hard material such as metal or the like, in which case the edge of the sleeve penetrates only a little into the material of the hose, the edge may in this case be bevelled as in the embodiment described above. The inner sleeve 13 has thus a stream-line shape. The inner diameter of the sleeve 13 is preferably made as large as or larger than the inner diameter of the hose.

In accordance with the sleeve 13 of Fig. 4 the corresponding sleeves of Figs. 2 and 3 may be flared outwards, as shown at 34 in Fig. 4. A sleeve 13 flared in this manner at both ends should preferably, in the embodiment according to Fig. 2, be mounted when the hose 11 is manufactured, that is the hose is preferably supplied with such sleeves at both ends by the manufacturer of the hose proper. In the embodiment according to Fig. 2 it is easy to remove the hose from the sleeve 14 and the connecting part 17, this being of considerable advantage, if the hose is to be repaired or replaced.

In certain circumstances, for example in the embodiment according to Fig. 4, it is not necessary to form a bead 33 in the inner sleeve 13, but the whole sleeve 13 may, when this sleeve and sleeve 14 have been placed on the end of the hose, be rolled out in such a way that the wall of the sleeve 13 is entirely or partly sunk into the wall of the hose. In this case an inner flare 34 is not necessary, because by sinking the sleeve into the material of the hose itself a smooth transition is ensured between the inner wall of the end 12 of the hose and the sleeve 13. To press out the sleeve 13 in such a way in some cases use may be made of a punch or the like. If the sleeves 13 and 14 are fixed to the hose in the manner just described an excellent connection between these parts is obtained.

What I claim is:

1. In a hose, in combination, a conduit member, an inner sleeve within one end of said member, and an outer sleeve around said end of said member, said member being clamped between said sleeves, both ends of said inner sleeve being flared outwardly to provide for stream line flow of fluid therethrough, one of said flared ends extending axially and radially beyond said end of said conduit member and the other of said flared ends being embedded in said conduit member whereby the clamping effect is increased.

2. In a hose, in combination, a conduit member, an inner sleeve within said member adjacent to one end thereof, an outer sleeve around said member adjacent to said end, the portion of said outer sleeve close to said end having an inner diameter substantially the same as the outer diameter of said member, an intermediate portion having an enlarged diameter, and the end of said outer sleeve remote from the end of said member being turned back within the portion of enlarged diameter to form a smooth end and to provide an annular space, and an outwardly extending annular ridge on said inner sleeve concentric with said annular space whereby the material of said conduit member is forced into said space.

3. In a hose, in combination, a conduit member, an inner sleeve within said member adjacent to one end thereof, an outer sleeve around said member adjacent to said end, the portion of said outer sleeve close to said end having an inner diameter substantially the same as the outer diameter of said member, an intermediate portion having an enlarged diameter, and the end of said outer sleeve remote from the end of said member being turned back within the portion of enlarged diameter to form a smooth end and to provide an annular space, an outwardly extending annular ridge on said inner sleeve concentric with said annular space whereby the material of said conduit member is forced into said space, and a coupling sleeve slidably mounted on the first mentioned portion of said outer sleeve, said portion of enlarged diameter serving as a stop to limit movement of said coupling sleeve in one direction.

AXEL ALBERT FORSBERG.